(No Model.)  2 Sheets—Sheet 1.

C. S. WEATHERLY.
BATH WATER HEATER.

No. 544,704.  Patented Aug. 20, 1895.

Witnesses
Jas. K. McCathran

Inventor
Charles S. Weatherly
By his Attorneys.
C. A. Snow & Co.

(No Model.) 2 Sheets—Sheet 2.
C. S. WEATHERLY.
BATH WATER HEATER.

No 544,704. Patented Aug. 20, 1895.

Witnesses
Jas. K. McCathran

Inventor
Charles S. Weatherly
By his Attorneys.
C. A. Snow & Co.

UNITED STATES PATENT OFFICE.

CHARLES S. WEATHERLY, OF GRAND RAPIDS, MICHIGAN.

BATH-WATER HEATER.

SPECIFICATION forming part of Letters Patent No. 544,704, dated August 20, 1895.

Application filed April 19, 1894. Serial No. 508,216. (No model.)

*To all whom it may concern:*

Be it known that I, CHARLES S. WEATHERLY, a citizen of the United States, residing at Grand Rapids, in the county of Kent and State of Michigan, have invented a new and useful Bath-Water Heater, of which the following is a specification.

My invention relates to an apparatus for heating water or other liquid, and adapted especially for heating bath-water, the objects in view being to provide a simple and efficient device for heating the liquid in its passage therethrough, the flow of liquid being continuous, and to provide an improved arrangement of parts for supporting the pans, deflecting the heat, &c.

Further objects and advantages of the invention will appear in the following description, and the novel features thereof will be particularly pointed out in the appended claim.

Figure 1:
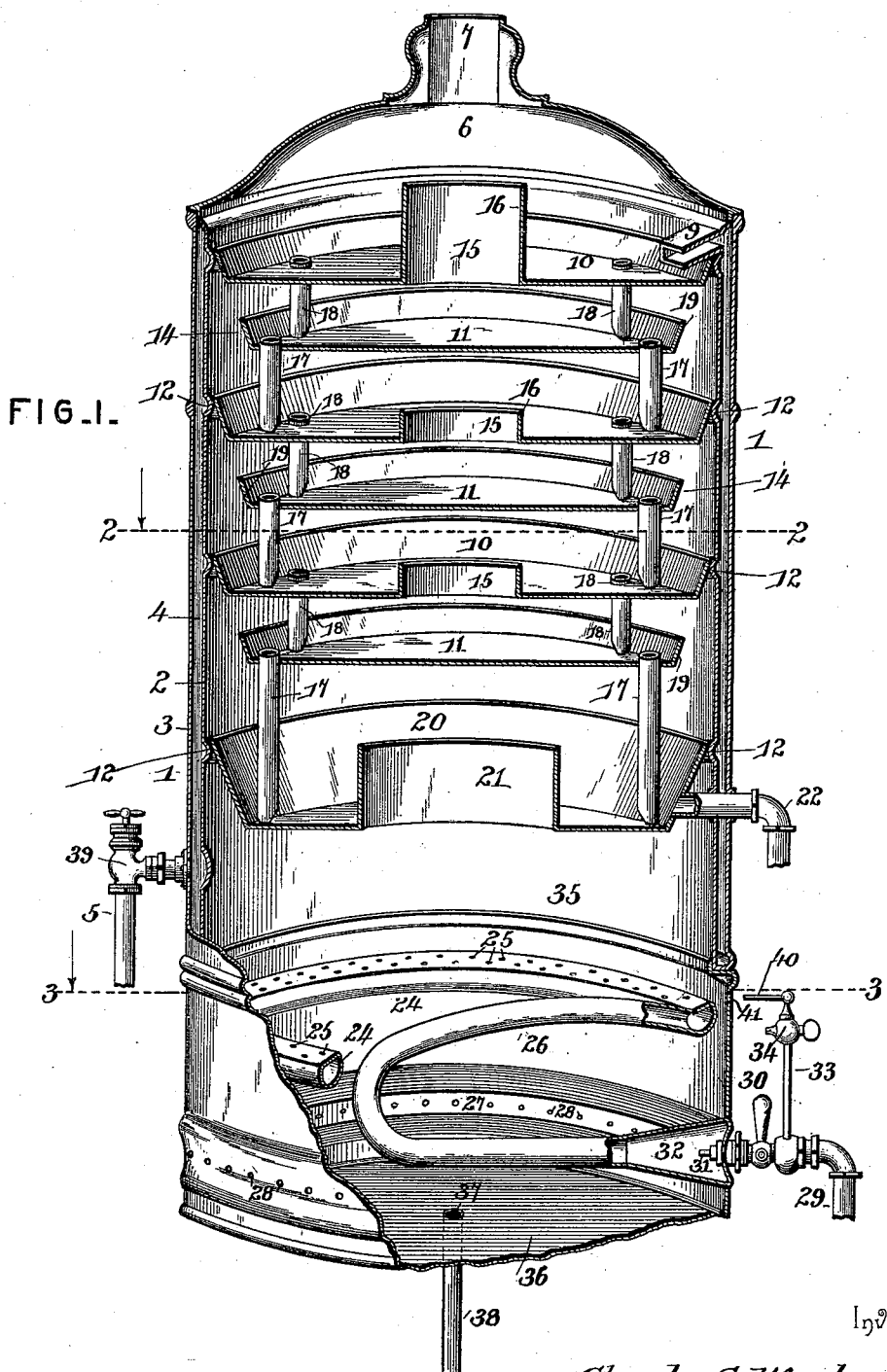
Figure 2:
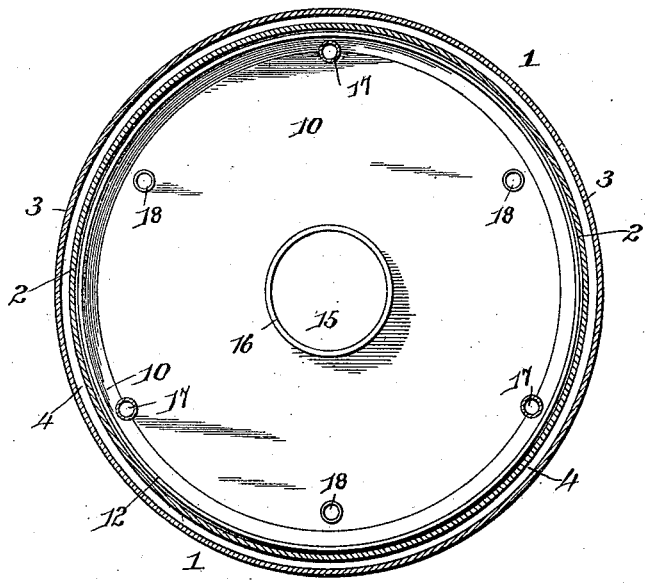
Figure 3:
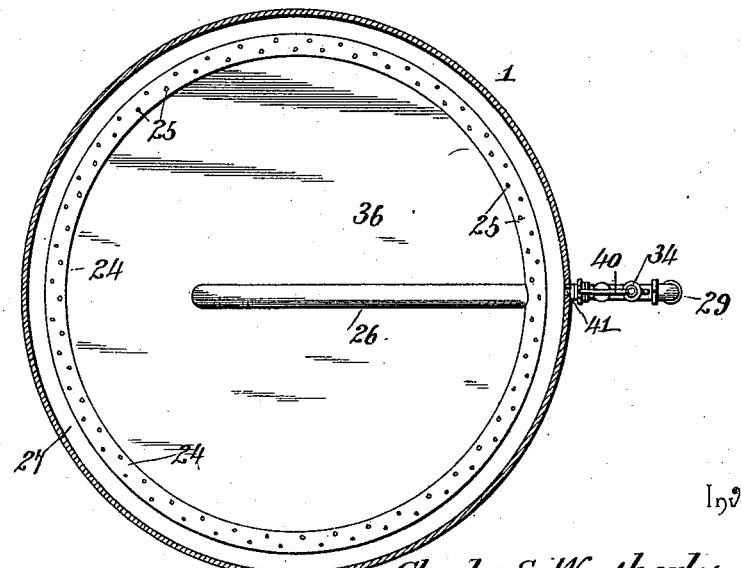

In the drawings, Figure 1 is a sectional perspective view. Fig. 2 is a horizontal section on the line 2 2 of Fig. 1. Fig. 3 is a horizontal section on the line 3 3 of Fig. 1.

Similar numerals of reference indicate corresponding parts in all the figures of the drawings.

1 designates the casing, consisting of concentric inner and outer cylinders 2 and 3, spaced apart to form an annular chamber 4, with which communicates the water-inlet pipe 5. The top of the casing is covered by a dome-cap 6, having a central outlet or vent 7. A spout 9 communicates with the annular chamber at its top and discharges into the uppermost of a series of shallow pans located horizontally in the casing. Alternately-arranged large and small pans 10 and 11 are provided, the large pans being of a diameter corresponding with that of the inner cylinder and being supported at their peripheries by the up-struck beads 12 on said inner cylinder, while the smaller pans are of less diameter than the inner cylinder, thus providing annular spaces or passages 14 between their peripheries and the walls of said cylinder. The larger pans are provided with central openings 15, which are flanged, as shown at 16, to prevent the premature escape of the water therefrom. The small pans are connected with the superjacent large pans by means of vertical connecting-tubes 17, and with the subjacent large pans by the small connecting-tubes 18, the upper ends of said connecting-tubes projecting slightly above the plane of the bottom of the pan with which said inner end is connected, in order to prevent the water from an upper pan from falling to the next lower pan until a certain predetermined quantity or depth has accumulated in the upper pan. The connecting-tubes 17 are preferably stepped at their lower ends in the angles which are formed between the bottoms and the peripheral flanges 19 of the smaller pans, whereby lateral displacement of such smaller pans is prevented, and the smaller pans are supported preferably by means of the connecting-tubes 18, which bear at their lower ends upon the bottoms of the subjacent large pans. The tubes 17 and 18 are beveled at their lower ends to allow a free flow of water.

The lowermost pan of the series constitutes a receiver 20, preferably of greater depth than the pans, and provided with a central flanged opening 21, and the hot-water outlet-pipe 22 communicates with this receiver.

The upper portion or drum of the casing, consisting of the above-described concentric cylinders, is preferably detachable from the lower portion or base of the casing, whereby the drum portion may be rotated or adjusted rotatably upon the base to adapt the outlet and inlet pipes for attachment to suitable supply and connecting pipes with which the device may be used.

Located within the base portion of the casing is an annular burner 24 provided in its upper side with suitable burner-openings 25, and connected with this burner is a goose-neck pipe or mixing-chamber 26, which is enlarged or belled at its lower end, as shown at 32, said enlarged or belled portion communicating with an air-inlet chamber 27 provided with perforations 28. The gas-supply pipe 29 is provided with a valve 30 and a nipple 31 which projects into the enlarged or belled portion of the goose-neck pipe or mixing-chamber, and a test-burner 33 is connected with the supply-pipe 29 beyond the valve 30 therein, and is provided with a controlling-valve 34. The horizontal nipple 40 of this test-burner is arranged in alignment with an opening 41 in the side of the casing, whereby the flame from the test-burner may be projected through said opening to ignite the gas as it escapes from the burner, and the location of the test-burner is such that the flame therefrom is brought into contact with the burner at the point of connection of the goose-neck pipe or mixing-chamber with said burner.

The space between the burner and the bottom of the lowermost pan or receiver constitutes a combustion-chamber 35, and located below the inlet-chamber 27 is a drip-pan 36 provided with an outlet 37, with which communicates a waste-tube 38.

The operation of the device is as follows: The gas is turned on at the test-burner and ignited previous to turning the valve 30 controlling the supply-pipe, and after the latter has been operated and the gas has been ignited at the annular burner the water is turned on by means of a suitable valve 39 arranged in the water-inlet pipe, the water thus admitted filling the annular space or chamber between the concentric inner and outer cylinders and then flowing through the spout 9 into the uppermost pan, and from thence successively through the conducting-pipes 17 and 18 and intermediate large and small pans to the lowermost pan or receiver 20, from which it may be drawn by means of a pipe 22.

It will be seen that the course of the heat produced by the burner is zigzag, in that it rises until it strikes the bottom of the lowermost pan or receiver and the adjacent wall of the inner cylinder, after which it is deflected and passes through the central opening of said lowermost pan. It then strikes the bottom of the pan above, is deflected, and passes around the sides thereof through the passage between the same and the wall of the inner cylinder, and so on throughout the series, until it finally escapes by way of the outlet or vent at the center of the dome-cap. It will be seen that the major portion of the heat is utilized in its passage through the device, and the large extent of heating-surface insures the rapid heating of the water or other fluid.

The object in arranging the connection of the mixing chamber or tube 26 with the burner contiguous to the test-burner is that the gas as it enters the burner from said mixing-chamber is ignited at once, and hence no explosion is caused, as when the connection of the mixing-chamber with the burner is at a remote point of the latter.

Various changes in the form, proportion, and the minor details of construction may be resorted to without departing from the spirit of the invention or sacrificing any of the advantages thereof.

Having described my invention, what I claim is—

In a bathwater heater, the combination of a casing having inner and outer concentric cylinders spaced apart to form an intervening annular chamber, a water supply-pipe connected therewith at its bottom, a series of annular open-topped pans arranged at intervals in the casing and having outer peripheries of equal diameters with the inner cylinder and resting upon beads upstruck upon the surface of said cylinder, intermediate pans of smaller diameter having their peripheries arranged out of contact with the walls of the inner cylinder, vertical tubes 17 secured at their upper ends in openings in the bottoms of the pans of smaller diameter with their extremities projecting slightly above the plane of the bottoms thereof and having their lower ends cut-away and resting upon the bottoms of the pans of the large diameter, whereby the small pans are supported by the large pans through the medium of the tubes, a plurality of the latter being employed for each pan, vertical tubes 18 fixed at their upper ends in openings in the bottoms of the large pans and extending to the bottoms of the small pans, and a burner arranged beneath and communicating with the bottom of the casing, substantially as specified.

In testimony that I claim the foregoing as my own I have hereto affixed my signature in the presence of two witnesses.

CHARLES S. WEATHERLY.

Witnesses:
PETER W. DECKER,
ABRAM H. SCHURLING.